(12) United States Patent
Wobben

(10) Patent No.: US 7,165,941 B2
(45) Date of Patent: Jan. 23, 2007

(54) METHOD AND APPARATUS FOR USE IN CONSTRUCTION OF WIND POWER INSTALLATION AND WIND POWER INSTALLATION EMPLOYING SAME

(76) Inventor: Aloys Wobben, Argestrasse 19 D-26607, Aurich (DE)

( * ) Notice: Subject to any disclaimer, the term of this patent is extended or adjusted under 35 U.S.C. 154(b) by 78 days.

(21) Appl. No.: 10/483,877

(22) PCT Filed: Jun. 26, 2002

(86) PCT No.: PCT/EP02/07044

§ 371 (c)(1),
(2), (4) Date: Jul. 19, 2004

(87) PCT Pub. No.: WO03/012291

PCT Pub. Date: Feb. 13, 2003

(65) Prior Publication Data
US 2004/0253109 A1 Dec. 16, 2004

(30) Foreign Application Priority Data

Jul. 20, 2001 (DE) ................................ 101 35 547
Aug. 28, 2001 (DE) ................................ 101 41 928

(51) Int. Cl.
*F03D 11/00* (2006.01)
(52) U.S. Cl. ................... 416/144; 416/203; 416/210 R
(58) Field of Classification Search ................ 416/144, 416/207, 203, 210 R; 29/889, 889.1
See application file for complete search history.

(56) References Cited

U.S. PATENT DOCUMENTS

| 1,802,094 | A |   | 4/1931 | Stuart |
| 2,742,095 | A | * | 4/1956 | Pitcairn et al. ................ 416/19 |
| 4,083,651 | A | * | 4/1978 | Cheney et al. ................ 416/11 |
| 5,219,454 | A |   | 6/1993 | Class |
| 6,726,451 | B1 | * | 4/2004 | Frampton ........................ 416/5 |

FOREIGN PATENT DOCUMENTS

| DE | 32 21 422 | 12/1983 |
| DE | 32 27 700 | 1/1984 |
| DE | 38 21 034 | 12/1989 |
| EP | 1 101 936 | 5/2001 |
| WO | WO 98/32968 | 7/1998 |

* cited by examiner

*Primary Examiner*—Ninh H. Nguyen
(74) *Attorney, Agent, or Firm*—Neil A. Steinberg; Mark Steinberg

(57) ABSTRACT

One aspect of the present invention concerns a process for mounting rotor blades to a rotor hub of a wind power installation in situ. In order to avoid high torques in the mechanical train of the wind power installation in the operation of mounting the rotor blades, a process according to one aspect of the invention includes the following steps: mounting a weight to at least one flange of the rotor hub; mounting the rotor blade in the installation situation; rotating the rotor hub into a predeterminable position; and exchanging the weight arranged on the flange of the rotor hub for a rotor blade by removing the weight and then mounting the rotor blade to the rotor hub.

31 Claims, 4 Drawing Sheets

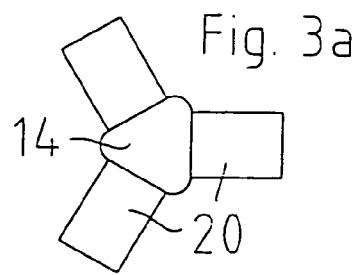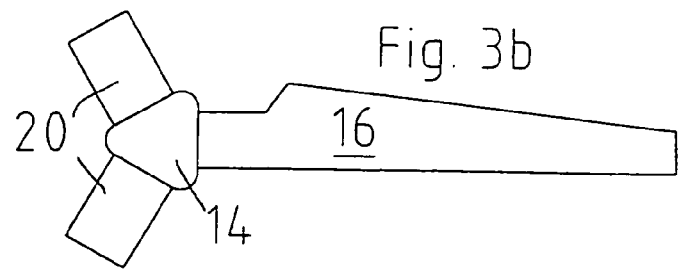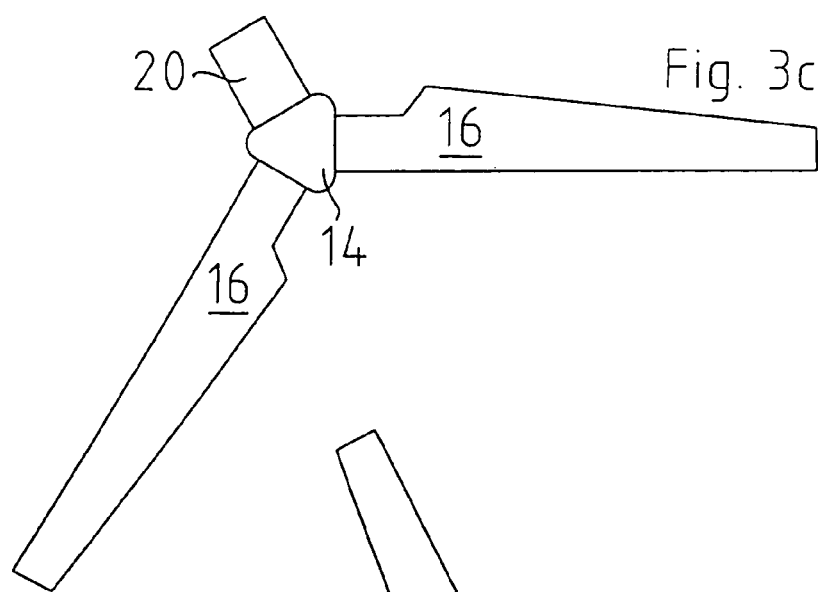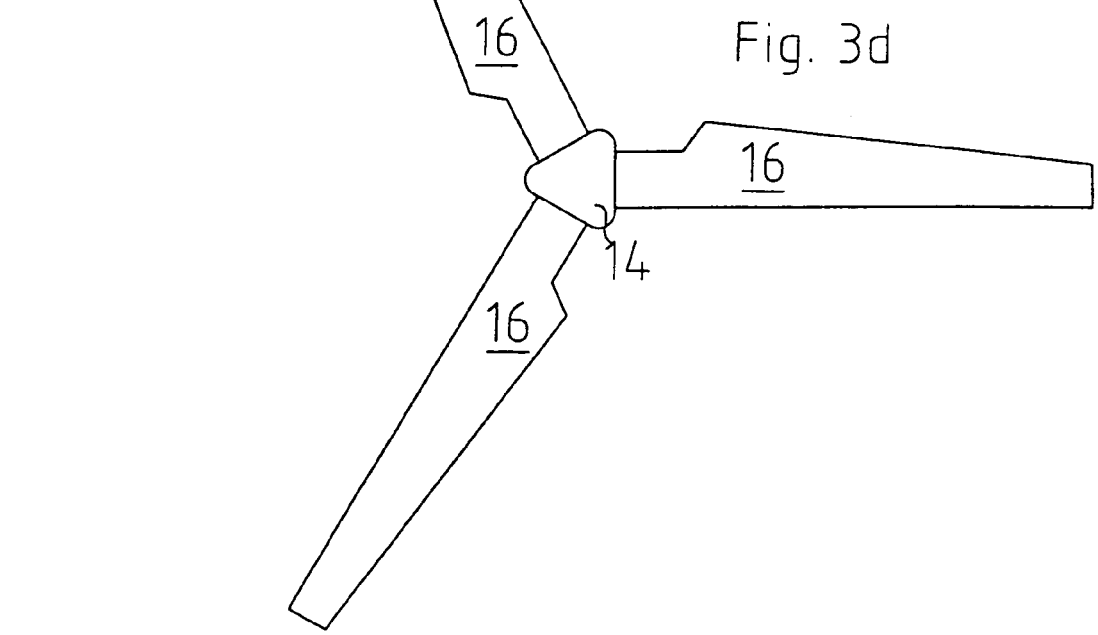

METHOD AND APPARATUS FOR USE IN CONSTRUCTION OF WIND POWER INSTALLATION AND WIND POWER INSTALLATION EMPLOYING SAME

RELATED INFORMATION

The present invention concerns a process for mounting rotor blades to a rotor hub of a wind power installation in situ.

Such a process is already known and avoids problems which arise when fitting rotor blades to a rotor hub on the ground and in terms of subsequent handling when mounting the rotor to the wind power installation. Such an assembly procedure is for example illustrated in Windkraft-Journal, edition 1/2000, page 13.

It can be seen from the illustration shown therein that firstly the pod with the rotor hub is mounted to the top of the pylon. Then a rotor blade is lifted by a crane and fixed in situ to the rotor hub.

That known process however suffers from the disadvantage that, after mounting of the first rotor blade, there is already a considerable imbalance due to the one-sided load of the blade, and, when the rotor hub is further rotated into the mounting position for the next blade, that imbalance produces a considerable torque to be overcome in the whole of the mechanical train and subjects the components thereof to a high stress.

That loading increases still further after fitting of the second blade, for example in the case of a three-blade rotor. The moments which occur in that situation can result in damage to or a reduction in the service life of the components, in particular in the mechanical drive train.

SUMMARY OF THE INVENTION

Therefore the object of aspects of the invention is to avoid high torques when mounting the rotor blades in situ.

The process according to aspects of the invention and the features provided in accordance with aspects of the invention provide that an imbalance in the region of the rotor hub is reduced or avoided from the outset even during construction of the wind power installation. By virtue thereof, during mounting of the rotor blades to the rotor hub and in particular in the rotary movement of the rotor hub which has not yet been completely equipped with rotor blades, only the moments which have already been taken into consideration in terms of dimensioning occur at a maximum at the rotor hub. That therefore reliably avoids damage to the components of the installation—for example bearings but also the generator (which usually provides for rotating the rotor hub in the mounting procedure).

In order to avoid unintended rotary movement of the rotor hub during mounting of the rotor blade, in particular after removal of the weight and prior to fitting of the rotor blade, the rotor hub is held in position by a rigid locking means. That rigid locking means also carries the torques which occur during that exchange procedure. In that respect the weights used are adapted in particular for fixing to the rotor hub of a wind power installation and at a maximum are of the mass corresponding to the mass of an individual rotor blade.

In order to produce a torque corresponding to the torque produced by a rotor blade, there must be a lever arm whose length corresponds to the distance of the centre of gravity of the rotor blade from the rotor hub if the weight is of the mass of the rotor blade.

In a particularly preferred feature the weight according to aspects of the invention includes a mass body and a lever arm, the mass body being displaceable along the lever arm. In that way it is possible to vary the torque acting on the rotor hub by the weight by virtue of a variation in the effective length of the lever arm, that is to say the distance between the rotor hub and the mass body.

In a further embodiment of aspects of the invention the mass body is preferably formed from one or more individual bodies. Those individual bodies are each of a predetermined mass and can be arranged in a row with each other. That configuration of the mass body means that the mass thereof can be varied in a simple manner. In addition, the centre of gravity of the mass body is displaced by virtue of arranging the individual bodies in a row with each other and the length of the lever arm is thus altered.

In a preferred development of aspects of the invention the mass of the weight amounts approximately to half the mass of a rotor blade. In that way the moments occurring during the rotation of the rotor hub are always still adequately compensated while however the weight on the one hand is of a smaller structure and on the other hand is easier to transport.

In a particularly preferred development of aspects of the invention each weight has at least one support eye at which it can be handled and held in particular by a crane. By virtue of that arrangement, the weight can be securely held after release from the rotor hub and set down on the ground before the rotor blade is lifted to the rotor hub for the mounting procedure.

BRIEF DESCRIPTION OF THE DRAWINGS

An embodiment of aspects of the invention is described in greater detail hereinafter with reference to the drawings in which:

FIGS. 3a–3d show the procedure involved in the process according to one aspect of the invention.

DETAILED DESCRIPTION

Figure 1:
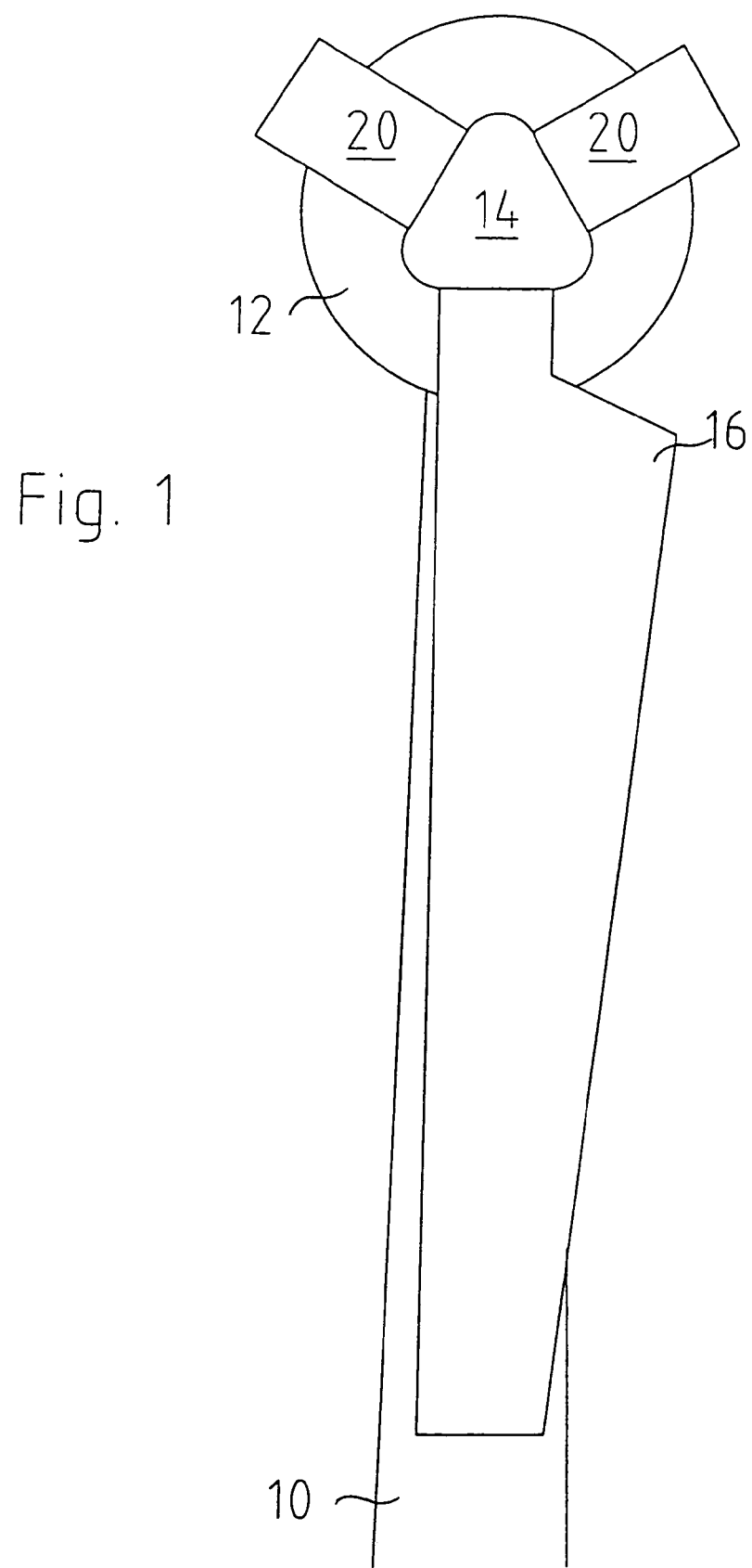
FIG. 1 is a front view of an upper part of a wind power installation.

FIG. 1 shows an upper portion of a pylon 10, at the tip of which is arranged a pod 12 in which is disposed the machine carrier which accommodates all the mechanically moved parts of the wind power installation. Provided at the centre of the pod 12 (of the machine carrier) is a rotor hub 14 to which rotor blades 16 can be fixed by way of flange connections to the hub. One of the rotor blades 16 is shown in the mounting position.

Provided at the remaining flange connections are weights 20 which at the rotor hub 14 bring about load conditions as occur when three rotor blades 16 are mounted in place. In this situation the resulting torque is zero. In that way the rotor hub 14 can now be rotated into a desired position. One of the weights 14 can then be removed and replaced by a rotor blade 16. As a result, the load conditions in turn still remain unchanged so that further rotary movement and replacement of the remaining weight 20 by a rotor blade 16 is also effected without any problem.

In order to prevent unwanted rotary movement of the rotor hub 14 during the exchange procedure and in order to carry torques which occur during the exchange procedure, the rotor hub can be locked in its required position by a locking device (not shown).

Figure 2:
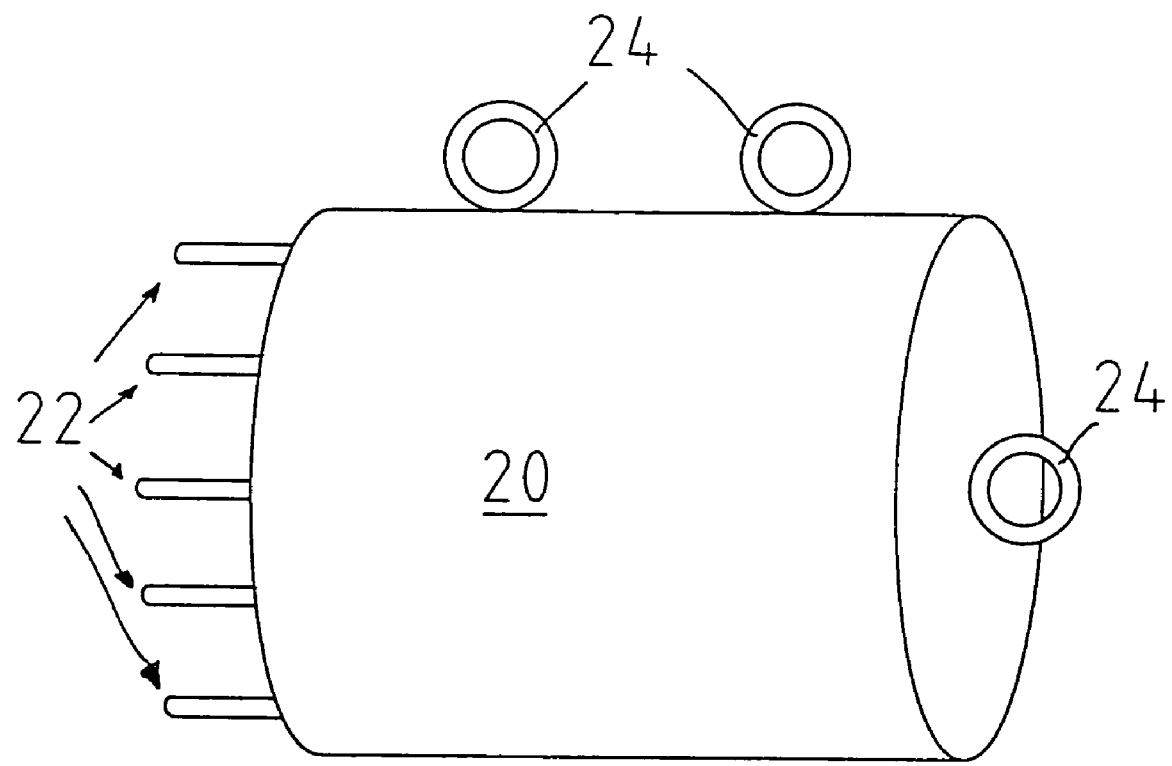
FIG. 2 is a simplified view of a weight according to one aspect of the invention.

FIG. 2 shows a weight 20 according to an aspect of the invention. This weight 20 is of a substantially cylindrical cross-section. Provided at one side of the weight 20 are studs 22 which make it possible to make a connection between the rotor hub 14 and the weight 20. Also illustrated on the weight 20 according to an aspect of the invention are eyes 24 which permit handling of the weight 20 on the one hand for transportation thereof and on the other hand also upon being fitted to the rotor hub 14 and also upon being removed from the rotor hub 14.

Accordingly, in accordance with the process of an aspect of the invention, the rotor hub 14 is already equipped with three weights 20 on the ground. The rotor hub 14 is then transported into the installation situation by a crane (not shown) so that the rotor blades 16 can then be mounted in situ in exchange for the weights 20.

FIGS. 3a–3d show in a simplified form the procedure involved in the process according to an aspect of the invention.

FIG. 3a shows the rotor hub 14 with three weights 20. In this respect one of the weights 20 is in a lateral position (at 3 o'clock).

In accordance with the process of an aspect of the invention the rotor hub 14 is now locked in its position so that rotation of the hub out of that position is prevented. The weight 20 in the lateral position is then released from the rotor hub 14 and removed and in its place a rotor blade 16 is fixed to the rotor hub 14.

This is shown in FIG. 3b with a rotor hub 16 in the lateral position instead of the weight 20. If now the locking device is released to prepare for the operation involved in mounting the next rotor blade 16, the load conditions at the rotor hub 14 are unaltered. The rotor hub 14 can thus be further rotated until the next weight 20 is at the lateral position (3'clock). The rotor hub 14 is then locked again and the operation involved in exchanging the weight 20 and the rotor blade 16 is repeated. The result of that further exchange procedure is shown in FIG. 3c.

Now too the load conditions are unchanged so that this operation can also be repeated a second time.

FIG. 3d shows the rotor with all rotor blades 16 mounted to the rotor hub 14, after the conclusion of the process of aspects of the invention.

This process according to aspects of the invention means that, at the rotor hub 14, there are only ever the moments for which the rotor hub and the whole of the subsequent drive train are designed. If all three moments are of equal magnitude, the resulting moment is always equal to zero.

Figure 4:
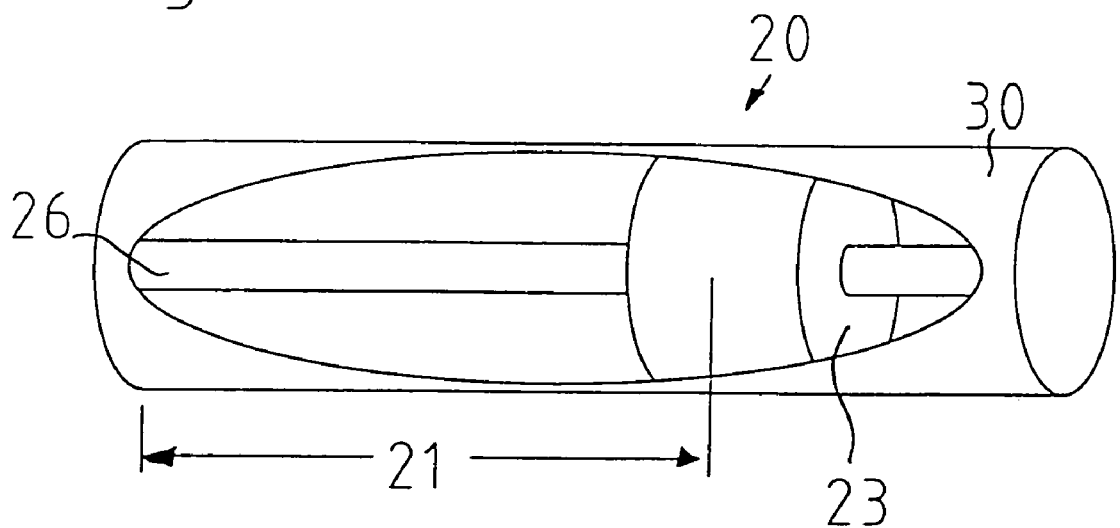
FIG. 4 shows a simplified internal view of a weight according to one aspect of the invention.

FIG. 4 shows a simplified internal view of a weight 20 according to aspects of the invention. In that respect the weight 20 is of an elliptical section. Disposed within the weight 20 is a lever arm 26, on which a mass body 23 is slidably arranged. The weight 20 can be so designed that fixing devices are provided at the left-hand side of the weight 20 (these however are not shown in the Figure).

In accordance with aspects of the invention the mass body 20 can be displaced along the lever arm 26 SO that the distance of the centre of gravity of the mass body 23 which is identified by reference 21 in this Figure, as measured from the left-hand end of the weight 20, is variable. That distance identified by reference 21 is the effective lever arm by way of which the mass body 23 acts on the rotor hub (not shown) and produces a moment.

With the mass of the mass body 23 being unchanged, the moment produced by the weight 20 can therefore be varied.

It will be appreciated that the man skilled in the art knows of devices for fixing the mass body 23 in a desired position, for example in the form of stoppers or other suitable holding elements, and such devices are not expressly illustrated in this Figure. As in accordance with aspects of the invention however that weight 20 is rotated with the rotor hub 14, displacement of the mass body 23 along the lever arm 26 must be reliably prevented.

Figure 5:
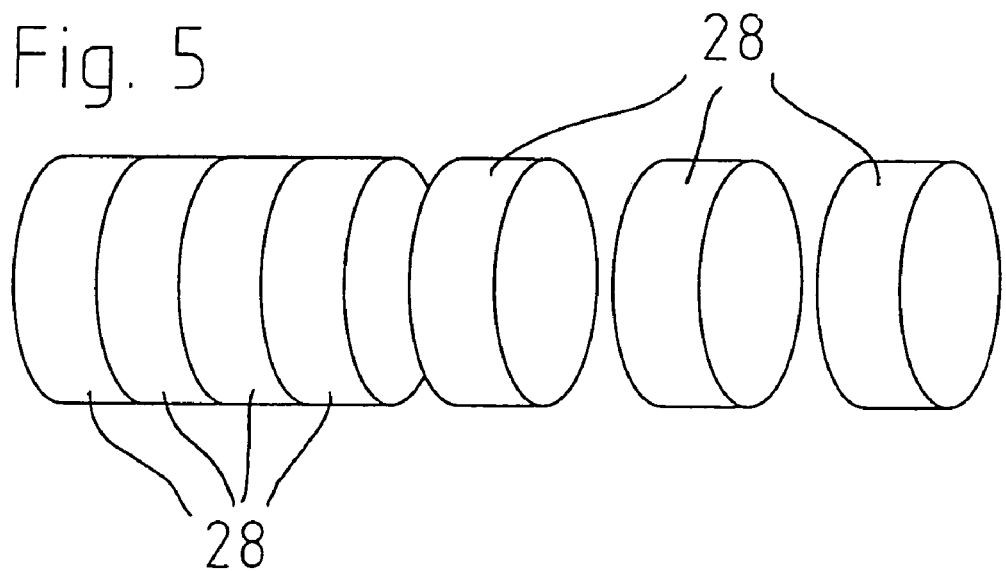
FIG. 5 shows a multiplicity of partial weights.

FIG. 5 shows a variant of the mass body. This Figure shows a plurality of individual weights 28 which can be combined together to form a mass body by being arranged in a row. Arranging the individual weights 28 in a row with each other in that way makes it possible to adapt the desired mass of the mass body 23 in predetermined stages, and this therefore affords a further possible way of varying the torque exerted by the weight 20.

The invention claimed is:

1. A method for in situ assembly of a wind power installation, the wind power installation having a pylon on which is supported a machine carrier, the wind power installation further having a rotor that includes a rotor hub having a first flange for receiving a first rotor blade, the method comprising:
    releasably mounting a weight to the first flange of the rotor hub;
    fitting the rotor hub to the machine carrier; and
    exchanging the weight for the first rotor blade by removing the weight and then mounting the first rotor blade to the rotor hub.

2. The method of claim 1 wherein the rotor hub further includes a second flange for receiving a second rotor blade and wherein the method further comprises releasably mounting a weight to the second flange.

3. The method of claim 1 further comprising positioning the rotor hub in a predetermined position.

4. The method of claim 3 further comprising holding the rotor hub in the predetermined position, at least during the mounting of the first rotor blade.

5. The method of claim 4 wherein the rotor hub is held in the predetermined position by a locking device, at least during the mounting of the first rotor blade.

6. The method of claim 1 wherein the rotor hub further includes a second flange for receiving a second rotor blade and wherein the method further comprises:
    releasably mounting a second weight to the second flange; and
    exchanging the second weight for the second rotor blade by removing the second weight and then mounting the second rotor blade to the rotor hub.

7. The method of claim 6 further comprising holding the rotor hub in a predetermined position, at least during the mounting of the second rotor blade.

8. The method of claim 6 wherein the rotor hub further includes a third flange for receiving a third rotor blade and wherein the method further comprises:
    releasably mounting a third weight to the third flange; and
    exchanging the third weight for the third rotor blade by removing the third weight and then mounting the third rotor blade to the rotor hub.

9. The method of claim 8 further comprising holding the rotor hub in a predetermined position, at least during the mounting of the third rotor blade.

10. A rotor for a wind power installation, the rotor comprising:
   a rotor hub; and
   a balancing weight temporarily fixed to the rotor hub, the balancing weight including a mass body and a lever arm and being exchangeable for a rotor blade of the wind power installation.

11. The rotor of claim 10 wherein the balancing weight applies a predetermined moment to the rotor hub, the predetermined moment approximately corresponding to a moment that the rotor blade applies to the rotor hub.

12. The rotor of claim 10 wherein the rotor blade has a center of gravity at a distance from the rotor hub and the lever arm of the balancing weight has an effective length that corresponds to the distance of the rotor blade center of gravity from the rotor hub.

13. The rotor of claim 12 wherein the balancing weight has a mass that corresponds to a mass of the rotor blade.

14. The rotor of claim 10 wherein the balancing weight has a mass that corresponds to a mass of the rotor blade.

15. The rotor of claim 10 wherein the balancing weight applies a predetermined moment to the rotor hub, the predetermined moment corresponding to one half of a moment that the rotor blade applies to the rotor hub.

16. The rotor of claim 10 wherein the mass body is formed from one or more individual bodies.

17. The rotor of claim 16 wherein the lever arm has devices temporarily fixed to a flange of the rotor hub.

18. The rotor of claim 16 wherein at least one of the individual bodies has devices temporarily fixed to a flange of the rotor hub and the balancing weight includes connecting means for connecting the individual bodies to each other.

19. The rotor of claim 10 wherein the mass body is displaceable along the lever arm.

20. The rotor of claim 19 wherein the balancing weight further includes a spindle drive between the mass body and the lever arm.

21. The rotor of claim 19 wherein the lever arm acts as a spindle drive and is rotatable by motor means in order to displace the mass body along the lever arm.

22. The rotor of claim 19 wherein the lever arm acts as a spindle drive and is manually rotatable in order to displace the mass body along the lever arm.

23. The rotor of claim 19 wherein the lever arm acts as a spindle drive, is rotatable by motor means in order to displace the mass body along the lever arm, and manually rotatable in order to displace the mass body along the lever arm.

24. The rotor of claim 10 wherein the balancing weight has at least one carrier eye for transporting the balancing weight.

25. The rotor of claim 10 wherein the balancing weight includes a casing that encloses the mass body and the lever arm.

26. The rotor of claim 25 wherein the casing has at least one aperture as a viewing opening for determining a position of the mass body.

27. The rotor of claim 26 wherein the balancing weight includes a row of bores as viewing openings which are spaced from each other in a longitudinal direction of the balancing weight.

28. The rotor of claim 26 wherein the viewing opening is in the form of a slot extending in a longitudinal direction of the balancing weight.

29. A wind power installation including a rotor as set forth in claim 10.

30. A method comprising:
   releasably fixing a balancing weight to a rotor hub prior to mounting a rotor blade of a wind power installation to the rotor hub.

31. A wind power installation comprising:
   a pylon;
   a machine carrier supported on the pylon;
   a rotor hub mounted to the machine carrier, the rotor hub having at least one flange for receiving a rotor blade; and
   a weight releasably mounted to the at least one flange and exchangeable for a rotor blade.

* * * * *